US007297746B2

(12) United States Patent
Rosen et al.

(10) Patent No.: US 7,297,746 B2
(45) Date of Patent: Nov. 20, 2007

(54) COLOR STABILITY OF ISOCYANATES

(75) Inventors: Richard Rosen, Princeton, NJ (US); Jean-Marie Bernard, Saint-Laurent d'Agny (FR); Shiming Wo, Monroe Township, NJ (US); Corinne Simone Duffy, Lyons (FR)

(73) Assignee: Rhodia Inc., Cranbury, NJ (US)

( * ) Notice: Subject to any disclaimer, the term of this patent is extended or adjusted under 35 U.S.C. 154(b) by 328 days.

(21) Appl. No.: 10/890,970

(22) Filed: Jul. 14, 2004

(65) Prior Publication Data

US 2005/0020766 A1 Jan. 27, 2005

(51) Int. Cl.

| | |
|---|---|
| ***C08C 19/02*** | (2006.01) |
| ***C08G 18/08*** | (2006.01) |
| ***C08J 3/00*** | (2006.01) |
| ***C08K 5/51*** | (2006.01) |
| ***C09L 75/00*** | (2006.01) |

(52) U.S. Cl. ................ 524/871; 252/397; 252/400.24; 252/404; 252/405; 524/589; 524/590; 524/147; 524/153; 560/331; 560/333

(58) Field of Classification Search ................ 524/589, 524/590, 591, 147, 153, 871; 252/397, 400.24, 252/404, 405, 182.2; 560/331, 333
See application file for complete search history.

(56) References Cited

U.S. PATENT DOCUMENTS

| | | | |
|---|---|---|---|
| 2,957,903 A | 10/1960 | Spiegler | 260/453 |
| 3,535,277 A | 10/1970 | Miller et al. | 260/45.95 |
| 3,715,381 A | 2/1973 | Spaunburgh et al. | 260/453 |
| 3,772,218 A | 11/1973 | Lamplugh et al. | 260/2.5 |
| 4,065,362 A | 12/1977 | Kataoka et al. | 203/58 |
| 4,297,472 A | 10/1981 | Heiss | 528/84 |
| 4,576,855 A * | 3/1986 | Okina et al. | 428/215 |
| 4,677,154 A * | 6/1987 | Narayan et al. | 524/710 |
| 4,814,103 A | 3/1989 | Potter et al. | 252/182.22 |
| 4,933,374 A | 6/1990 | Suhoza et al. | 521/117 |
| 5,156,762 A | 10/1992 | Suhoza et al. | 252/182.26 |
| 5,175,349 A | 12/1992 | Gupta et al. | 560/333 |
| 5,182,310 A | 1/1993 | Skorpenske et al. | 521/116 |
| 5,194,559 A | 3/1993 | Okazaki et al. | 528/49 |
| 5,207,942 A | 5/1993 | Scherzer et al. | 252/182.2 |
| 5,258,548 A | 11/1993 | Imokawa | 560/333 |
| 5,302,749 A | 4/1994 | Nagata et al. | 560/333 |
| 6,166,128 A | 12/2000 | Adkins et al. | 524/589 |
| 6,291,577 B1 | 9/2001 | Yang et al. | 524/589 |
| 2004/0049028 A1* | 3/2004 | Laas et al. | 540/202 |

FOREIGN PATENT DOCUMENTS

| | | |
|---|---|---|
| EP | 0 844 276 B1 | 10/2001 |
| GB | 2 184 733 A | 7/1987 |

OTHER PUBLICATIONS

Page 2440 of VI—Formulation of Polyurethanes re Solvent retention and Catalysts.

Pages 80 and 81 of III—Isocyanate Chemistry.

* cited by examiner

*Primary Examiner*—Patrick Niland

(57) ABSTRACT

A hardener composition for use as a component of a two component polyurethane coating composition, comprising a polyisocyanate, a catalyst for promoting reaction of the polyisocyanate with a reactive hydrogen compound, and one or more antioxidants selected from: a first antioxidant comprising one or more of sterically hindered phenol antioxidants and secondary aryl amine antioxidants, and a second antioxidant comprising one or more organophosphite antioxidant, exhibits improved color stability.

8 Claims, No Drawings

COLOR STABILITY OF ISOCYANATES

FIELD OF THE INVENTION

This invention relates to color stabilizing compositions, and more particularly to color stabilizing compositions useful for stabilizing the color of isocyanates, particularly polyisocyanate oligomers and prepolymers, to be used to prepare polyurethane coatings, films and the like therefrom. The polyisocyanates can also be used to form adhesives, sealants and elastomers.

BACKGROUND OF THE INVENTION

Two component thermosetting polyurethanes are widely used in protective coatings or films in a broad range of applications, such as for example, coatings for automotive machinery, equipment, and other surfaces in need of a protective coating. These room temperature-curable polyurethanes are prepared from polyisocyanates and a component containing an active hydrogen compound, such as a polyol or an amine.

Two-component polyurethane coating systems include a polyisocyanate component that reacts with a polyol component that comprises, for example, an acrylic polyol or polyester polyol, to form useful films. The system also includes organic solvents, and a variety of adjuvant components, e.g., surface active agents, pigments, dispersants, diluents, and fillers. This type of coating is one of the finest coatings available that can be produced without the application of heat or other external sources of energy. They are very useful for objects that cannot be heat-cured, such as large machinery, airplanes, ships and vehicles.

In some embodiments, two component polyurethane compositions are cured at elevated temperature. It has been recognized that such systems tend to discolor at elevated temperatures and prior art methods to stabilize the color of such polyurethanes systems have been developed. The approach of these methods is either purification or stabilization of the polyisocyanate. For example, U.S. Pat. No. 4,297,472 teaches adding a small amount of vicinal diols to the formulation to improve the color stability of the polyurethanes. U.S. Pat. No. 4,065,362 teaches a process to purify the organic isocyanate, U.S. Pat. No. 3,715,381 teaches incorporating 2,4-di(t-butyl)-p-cresol (BHT) in the formulation, and U.S. Pat. No. 2,957,903 teaches incorporating an amount of triaryl phosphite in a polyisocyanate. U.S. Pat. No. 4,677,154 relates to elimination of discoloration in polyurethanes, particularly thermoplastic polyurethanes, by the addition to the reaction mixture from 0.01 to 1 percent by weight, based on the isocyanate component, a stabilizer package characterized as BHT and a compound selected from a specific group of compounds which includes tris(nonylphenyl) phosphite, distearyl thiodipropionate, triisodecyl phosphite, trilauryl trithiophosphite, and blends thereof.

Other two component polyurethane systems are curable at relatively mild temperatures in the presence of a catalyst for promoting reaction of the polyisocyanate with the polyol. In one embodiment of such low temperature curing two component polyurethane coating systems, the catalyst is included in the polyisocyanate component of the system to form a "hardener" component that is subsequently combined with the polyol component to form a curable coating composition. However, it has been found that including the catalyst in the polyisocyanate component of such systems markedly increases the potential for undesirable discoloration of the polyisocyanate and related coating and despite the known color stabilizing methods, it has been found that a need exists for a stabilizer that will efficiently stabilize the color of a solution of an isocyanate in the presence of a catalyst for the reaction of the isocyanate with an active hydrogen compound.

SUMMARY OF THE INVENTION

It has been discovered in accordance with this invention that color of isocyanates can be stabilized by admixing with the isocyanate a color stabilizing effective amount of a stabilizer comprised of a trialkyl phosphite component, each alkyl group of said trialkyl phosphite component having less than about 10 carbon atoms. Typically, the stabilizer is a system which will also further comprise a phenolic antioxidant component (e.g. a t-butylated hydroxytoluene selected from the group consisting of 2,6-ditertiarybutyl hydroxytoluene and 2-tertiarybutyl hydroxytoluene).

In a first aspect, the present invention is directed to a hardener composition for use as a component of a two component polyurethane coating composition, comprising:

- a polyisocyanate,
- a catalyst for promoting reaction of the polyisocyanate with a reactive hydrogen compound, and
- one or more antioxidants selected from:
  - a first antioxidant comprising one or more of sterically hindered phenol antioxidants and secondary aryl amine antioxidants, and
  - a second antioxidant comprising one or more organophosphite antioxidants.

In a second aspect, the present invention is directed to a polyisocyanate formulation suitable for use in preparing polyurethanes therefrom in which the color stabilizing effective amount of the stabilizer system trialkyl phosphite component, each alkyl group of said trialkyl phosphite component having less than about 10 carbon atoms, comprises from about 0.1 to about 2.0 weight % based on the total weight of the polyisocyanate formulation.

In a third aspect, the present invention provides a color stabilized isocyanate composition for use in a formulation for preparing polyurethanes therefrom, the color stabilized isocyanate composition comprising:

(a) a phenolic antioxidant, e.g. a t-butylated hydroxytoluene selected from the group consisting of 2,6-ditertiarybutyl hydroxytoluene and 2-tertiarybutyl hydroxytoluene, (b) a trialkyl phosphite component, each alkyl group of said trialkyl phosphite component having less than about 10 carbon atoms and (c) at least one isocyanate.

In a fourth aspect, the present invention is directed to a method for making a color stabilized hardener composition for use as a component of a polyurethane coating composition, comprising combining a polyisocyanate, a catalyst for promoting reaction of the polyisocyanate with a reactive hydrogen compound, and one or more antioxidants selected from:

- a first antioxidant comprising one or more of sterically hindered phenol antioxidants and secondary aryl amine antioxidants, and
- a second antioxidant comprising one or more organophosphite antioxidants.

In a fifth aspect, the present invention is directed to a method for stabilizing the color of a hardener composition for use as a component of a polyurethane coating composition, said hardener composition comprising a polyisocyanate and a catalyst for promoting reaction of the polyisocyanate with a reactive hydrogen compound, comprising adding to the hardener composition a color stabilizing amount of one or more antioxidants selected from:

a first antioxidant comprising one or more of sterically hindered phenol antioxidants and secondary aryl amine antioxidants, and a second antioxidant comprising one or more organophosphite antioxidants.

By this invention, the shelf life of the isocyanate is improved.

DETAILED DESCRIPTION OF THE INVENTION

Suitable sterically hindered phenols antioxidants include those hindered phenols that are commercially available as antioxidants, for example, under the IONOL or IONOX trade names from Laporte Performance Chemicals, Southampton, UK, such as 2,4-dimethyl-6-butylphenol, 4,4'-methylene-bis(2,6-di-tert-butylphenol), and 2,6-di-tert. butyl-N-N'dimethylamino-p-cresol, butylated hydroxyanisole, 2,6-di-tertbutylphenol, 2,4,6-tri-tertbutylphenol, 2-tert-butylphenol, 2,6-diisopropylphenol, 2-methyl-6-tert-butylphenol, 2,4-dimethyl-6-tertbutylphenol, 4-(N,N-dimethylaminomethyl)-2,8-di-tertbutylphenol, 4-ethyl-2,6-di-tertbutylphenol.

Suitable secondary aryl amine antioxidants include those secondary amines known for use as antioxidants, such as, for example, diphenylamine, alkyl diphenylamines, phenylnaphthylamines, and alkylphenylnaphthylamines.

In one embodiment, the first antioxidant comprises 2,6-ditertiarybutyl-4-methylphenol, also known as butylated hydroxy toluene or "BHT".

Suitable organophosphite antioxidants include those organophosphites known for use as antioxidants. In one embodiment, the organophosphite comprises one or more compounds according to the formula:

$$(RO)_3P$$

wherein each R is independently alkyl or aryl.

As used herein, the term "alkyl" refers to a radical of a saturated aliphatic group, including straight chain alkyl groups, branched chain alkyl groups, and cycloalkyl groups, wherein such straight and branched chain alkyl groups may each be optionally substituted with cycloalkyl, such cycloalkyl groups may optionally be substituted with straight or branched chain alkyl, and such straight chain alkyl, branched chain alkyl, and cycloalkyl groups may each be optionally be substituted with aryl, and includes, for example, methyl, ethyl, isopropyl, t-butyl, isodecyl, stearyl, icosyl, cyclohexyl, phenylmethyl.

As used herein, the term "aryl" as used herein means a compound containing one or more 6-membered unsaturated hydrocarbon rings, wherein the unsaturation may be represented formally by three conjugated double bonds and which may optionally be substituted at one or more carbon atoms of such rings by independently selected alkyl groups, and includes, for example, phenyl, naphthyl, methylphenyl, dimethoxyphenyl, 5-isopropyl-2-methylphenyl, methylphenyl, t-butylphenyl, nonylphenyl.

In one embodiment, each R is independently ($C_1$-$C_{30}$) alkyl or ($C_1$-$C_{30}$)aryl. As used herein in reference to an organic group, the notation "($C_n$-$C_m$)" where n and m are each positive integers, mean that the group contains from n carbon atoms to m carbon atoms per group.

In one embodiment, each R is independently ($C_5$-$C_{30}$) alkyl, more typically ($C_{10}$-$C_{30}$) alkyl, or ($C_1$-$C_{30}$) alkyl.

In one embodiment, each R is independently ($C_1$-$C_9$) alkyl, more typically ($C_1$-$C_4$) alkyl.

Suitable organophosphites include, for example, tri(butyl) phosphite, tri(octyl)phosphite, tri(phenyl)phosphite, tri(nonylphenyl)phosphite, tri(butyltripentyl)phosphite tri(2,4-di-t-butyl)phosphite.

In one embodiment, the organophosphite antioxidant comprises a trialkyl phosphite is preferably one wherein each alkyl group of said trialkyl phosphite component has less than about 9 carbon atoms, more preferably from about 3 (e.g. tri-n-propyl or tri-isopropyl) to about 5 (e.g. tri-n-pentyl, tri-sec-pentyl, or tri-neo-pentyl) carbon atoms, and is most preferably a tributyl phosphite selected from the group consisting of n-butyl, sec-butyl, iso-butyl, and tert-butyl. Each of the three alkyl groups in a given molecule may be the same or different, so long as each has less than 10, more preferably less than 9 and even more preferably less than 8 carbon atoms, i.e. from about 1 to about 7 carbon atoms. Each alkyl group may be straight-chained or branched.

The first antioxidant and second antioxidant are included in an amount effective to stabilize the color of the hardener composition, typically for a time period of greater than or equal to about one month, more typically greater than or equal to one year, at about 25° C. A color stabilizingly effective amount is typically from about 0.01 to about 3.0, preferably from about 0.1 to about 2.0, most preferably from about 0.2 to about 1.0 combined total weight % of the first antioxidant and second antioxidant, based on the total weight of the polyisocyanate composition in which they are admixed.

The weight ratio of first antioxidant compound to second antioxidant employed in the color stabilized composition and process of this invention, when both are included, is typically approximately equal on a weight basis, but may vary widely, e.g. from about 10:1 to about 1:10, more typically in the range of from about 2:1 to about 1:2, even more typically from about 1.5:1 to about 1:1.5 and most typically about 1:1.

The color stabilizing components of this invention can be employed in any suitable polyisocyanate to be used to produce polyurethanes therefrom. Such polyisocyanates can be monomeric polyisocyanates or polyisocyanate oligomers or prepolymers with some pendant NCO groups. Polyfunctional isocyanates have the general formula:

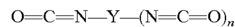

$$O{=}C{=}N{-}Y{-}(N{=}C{=}O)_n$$

wherein Y is an aromatic, aliphatic or cycloaliphatic polyvalent group and n is or 1 or more. Examples of suitable isocyanates are isophorone diisocyanate, 1,3- and 1,4-cyclohexane diisocyanate, 1,2-ethylene diisocyanate, 1,4-tetramethylene diisocyanate, 1,6-hexamethylene diisocyanate, 2,2,4 and 2,4,4-trimethyl-1,6-hexamethylene diisocyanate, 1,12-dodecane diisocyanate, alpha,alpha'-diisocyanatodipropyl ether, 1,3-cyclobutane diisocyanate, 2,2- and 2,6-diisocynanato-1-methylcyclohexane, 2,5 and 3,5-bis(isocyanatomethyl)-8-methyl-1,4-methano-decahydronaphthalene, 1,5-, 2,5-, 1,6- and 2,6-bis (isocyantomethyl)-4,7-methanohexahydroindane, 1,5-, 2,5- and 2,6-bis (isocyanato)-4,7-methanehexahydroindane, 2,4'- and 4,4'-dicylohexyl diisocyanate, 2,4- and 2,6-hexahydrotolylene diisocyanate, perhydro-2,4'- and 4,4'-diphenylmethane diisocyanate, alpha,alpha'-diisocyanato-1,4-diethylbenzene, 1,3- and 1,4-phenylene diisocyanate, 4,4'-diisocyanatobiphenyl, 4,4'-diisocyanato-3,3'- dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanato diphenylmethane, naphthylene 1,5-diisocyanate, 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, 2,4,4'-triisocyanatodiphenyl ether, 4,4',4"-triisocyanatotriphenylmethane, and the like and mixtures thereof.

Suitable polyisocyanate oligomers are compounds that comprise two or more isocyanate functional monomeric repeating units per molecule, including polyisocyanate dimers, polyisocyanate trimers, products of condensation of two or more polyisocyanate dimers, such as, bis-dimers, products of condensation of two or more polyisocyanate trimers, such as bis-trimers, as well as various condensation products dimers with trimers, and are typically obtained by condensation of isocyanate monomers. Examples of suitable polyisocyanate oligomers include 2,4,6-trioxo-hexahydro-1,3,5-triazine, 6-imino-5-oxa-1,3-diazine-2,4-dione, 6-imino-1,3,5-triazine-2,4-dione, 5-oxa-1,3-diazine2,4,6-trione, uretidine-2,4-dione, 4-imono-2-oxo-1,3-diazetidine, as well as urethanes or esters of carbamic acid, allophonate, urea, biuret, and carbodiimide. As further examples of such polyisocyanate oligomers, there may be mentioned hexamethylene diisocyanate trimers (HDI-trimers) such as Tolonate HDT from Rhodia, Inc. Examples of other suitable polyisocyanate oligomers are aliphatic polyisocyanate oligomers such as those derived from isophorone diisocyanate, hexamethylene diisocyanate trimers consisting of high or low viscosity hexamethylene diisocyanate derivatives, and norbornene diisocyanate biurets and trimers. The isocyanate will typically be unblocked, i.e. will have free isocyanate functionality, in the compositions of this invention.

In one embodiment, the polyisocyanate comprises, on average, from greater than 1 to about 20, more typically from about 2 to about 20, even more typically from about 2.5 to about 10, isocyanate groups per molecule of the polyisocyanate.

The color stabilizer components of this invention are particularly effective in color stabilizing for substantially anhydrous solutions of polyisocyanate oligomers, such as solvent solutions of such polyisocyanate oligomers containing from about 35 to about 90 weight % solids.

The color stabilizing compounds of this invention may be added to the polyisocyanates neat or in any suitable organic solvent compatible with the color stabilizer compounds and the polyisocyanate oligomers, such as aprotic solvents, for example, oxygenated hydrocarbons (e.g. ketones, esters, ethers, glycol esters, and glycol ether esters), halogenated hydrocarbons, and aliphatic and/or aromatic hydrocarbons, and mixtures thereof. A typical oxygenated solvent is butyl acetate and a typical alkaryl hydrocarbon is mixed isomers of xylene. Typically, the solvent will be a mixture of a major amount of oxygenated hydrocarbons and a minor amount of aliphatic and/or aromatic hydrocarbons, e.g. in a weight ratio of from about 4:1 to about 1.5:1. The amount of solvent in the isocyanate compositions will typically be from about 65% to about 10%, more typically from about 50% to about 20%, by weight of the composition.

It has been found that the color stabilizing composition is effective even when the isocyanate composition also contains a catalyst for the reaction of the isocyanate and a reactive hydrogen compound.

Examples of such catalysts are tertiary amines or amidines and organometallic compounds and mixtures thereof. Suitable amines are both acyclic and, in particular, cyclic compounds, such as triethylenediamine, tetramethyl butanediamine, 1,4-diazabicyclooctane (DABCO), 1,8-diazabicyclo-(5.4.0)-undecene, N,N-dimethylcyclohexyl amine, and N,N-dimethyl ethanolamine, as well as mixtures thereof.

Suitable organometallic compounds include organotin, organozinc, organobismuth, and organozirconium compounds, as well as mixtures thereof.

The catalysts preferably used are in particular organo-tin compounds. Organo-tin compounds are compounds containing both tin and an organic component, more particularly compounds containing one or more Sn—C bonds. Organic compounds in the broader sense also include, for example, salts such as tin (II) octoate and tin (II) stearate. Tin compounds in the narrower sense include, above all, compounds of tetravalent tin corresponding to the general formula $R^1_{n+1}SnX_{3-n}$, where n is a number of 0 to 2, $R^1$ is an alkyl, aryl, alkaryl and/or aralkyl group and finally X is an oxygen, sulfur or nitrogen compound. The groups $R^1$ or X may even be attached to one another and, in that case, form a ring together with the tin. Such compounds are described in EP 491 268, EP 490 277 and EP 423 643. $R^1$ best contains at least 4 carbon atoms and, more particularly, at least 8 carbon atoms. The upper limit is generally 12 carbon atoms. In a preferred embodiment, n=0 or 1 and a mixture of 1 and 0. X is preferably an oxygen compound, i.e. an organotin oxide, hydroxide, alcoholate, beta-dicarbonyl compound, carboxylate or ester of an inorganic acid. However, X may also be a sulfur compound, i.e. an organotin sulfide, thiolate or thioacid ester. Among the Sn—S compounds, thioglycolic esters, for example compounds containing the following groups:

—S—$CH_2$—$CH_2$—CO—O—$(CH_2)_{10}$—$CH_3$ or

—S—$CH_2$—$CH_2$—CO—O—$CH_2$—$CH(C_2H_5)$—$CH_2$—$CH_2$—$CH_2$—$CH_3$ are of particular interest. Compounds such as these meet another criterion, namely: the molecular weight of the organo-tin compound should preferably be above 400 and, more particularly, above 250, more A preferred class of compounds are the dialkyl tin(IV) carboxylates (X═O—CO—$R^1$). The carboxylic acids contain 2, preferably at least 10 and more preferably 14 to 32 carbon atoms. In one embodiment, the catalyst comprises a dialkyltin dicarboxylate, wherein the alkyl groups of the dialkyltin dicarboxylate are each independently selected from alkyl groups containing from 1 to 12 carbon atoms per group and the carboxylate groups of the dialkyltin dicarboxylate are each independently selected carboxylate groups containing from 2 to 32 carbon atoms per group. Dicarboxylic acids may also be used. The following are specifically mentioned as acids: adipic acid, maleic acid, fumaric acid, malonic acid, succinic acid, pimelic acid, terephthalic acid, phenyl acetic acid, benzoic acid, acetic acid, propionic acid and, in particular, 2-ethylhexanoic acid, caprylic acid, capric acid, lauric acid, myristic acid, palmitic acid and stearic acid. Specific dialkyl tin carboxylates include dibutyl tin diacetate, dioctyl tin diacetate, dibutyl tin maleate, dibutyl tin bis-(2-ethylhexoate), dibutyl tin dilaurate; tributyl tin acetate, bis-(beta-methoxycarbonylethyl)-tin dilaurate and bis-(beta-acetylethyl)-tin dilaurate.

Tin oxides and sulfides and also thiolates may also be used. Specific compounds are bis-(tributyl tin)-oxide, bis-(trioctyl tin)-oxide, dibutyl and dioctyl tin-bis-(2-ethylhexyl thiolate), dibutyl and dioctyl tin didodecyl thiolate, bis-(beta-methoxycarbonyl ethyl)-tin didodecyl thiolate, bis-(beta-acetyl ethyl)-tin-bis-(2-ethyl hexyl thiolate), dibutyl and dioctyl tin didodecyl thiolate, butyl and octyl tin tris- (thioglycolic acid-2-ethyl hexoate), dibutyl and dioctyl tin-bis-(thioglycolic acid-2-ethyl hexoate), tributyl and trioctyl tin-(thioglycolic acid-2-ethyl hexoate) and butyl and octyl tin tris-(thioethylene glycol-2-ethyl hexoate), dibutyl and dioctyl tin-bis-(thioethylene glycol-2-ethyl hexoate), tributyl and trioctyl tin-(thioethylene glycol-2-ethyl hexoate) with the general formula $$R_{n+1}Sn(SCH_2CH_2OCOC_8H_{17})_{3-n},$$

where R is a $C_{4-8}$ alkyl group, bis-(beta-methoxycarbonyl ethyl)-tin-bis-(thioethylene glycol-2-ethyl hexoate), -tin-bis-(thioglycolic acid-2-ethyl hexoate) and bis-(beta-acetyl ethyl)-tin-bis-(thioethylene glycol-2-ethyl hexoate) and -tin-bis-(thioglycolic acid-2-ethyl hexoate).

The other groups of tin compounds mentioned include tributyl tin hydroxide, dibutyl tin diethylate, dibutyl tin dibutylate, dihexyl tin dihexylate, dibutyl tin diacetyl acetonate, dibutyl tin diethyl acetyl acetate, bis-(butyl dichlorotin)-oxide, bis-(dibutyl chlorotin)-sulfide, dibutyl and dioctyl tin dichloride, dibutyl- and dioctyl tin dithioacetate.

In one embodiment, the hardener composition comprises a catalytically effective amount of catalyst. The term "catalytically effective amount" means a substoichiometric amount of catalyst relative to a reactant. As used herein, a catalytically effective amount is typically from about 10 to about 5,000 parts by weight ("pbw") catalyst per 1,000,000 pbw polyisocyanate, more typically from about 100 to about 2,500 pbw catalyst per 1,000,000 pbw polyisocyanate.

The hardener composition of the present invention is used by combining the hardener with a reactive hydrogen compound, for example, a polyol, to form a reactive coating composition. Suitable polyols are known in the art and include, for example, polyester polyols and acrylic polyols.

The invention is illustrated by, but not limited to, the following examples conducted with Tolonate HDT (hexamethylene diisocyanate trimer).

EXAMPLES

Samples of hardener compositions, containing Tolonate HDT, BHT, Tributylphosphite (TBP) and Triisooctylphophite (TioP) and dibutyltindilaurate (DBTDL) in the relative amounts set forth below in TABLE I were made in a 1:1:0.5 blend by weight of butyl acetate/methyl amyl ketone/xylene. These samples were prepared using a screening experimental design series varying % solids, catalyst concentration, BHT and phosphite concentration. Catalyst concentration is based upon % solids.

The samples were aged in a 60° C. oven for respective periods of 1, 2 and 4 weeks. APHA values were obtained fro the aged samples using a Minolta CT-310 calorimeter equipped with a 10 mm path length cell. APHA values were put into the statistical design program JMP and the data analyzed. A model was made with an R-squared adjusted=0.84 using the 4 week APHA values.

The following are the results based on the model at a catalyst concentration of 1000 ppm:

TABLE I

| % Solids | Phosphite | Phenol | Phosphite Concentration | Phenol Concentration | APHA |
|---|---|---|---|---|---|
| 50 | TBP | BHT | 0.1 | 0.1 | 66 |
| 75 | TBP | BHT | 0.1 | 0.1 | 115 |
| 75 | TioP | BHT | 0.1 | 0.1 | 128 |
| 50 | TBP | BHT | 0.5 | 0.5 | 15 |
| 50 | TioP | BHT | 0.5 | 0.5 | 28 |
| 75 | TBP | BHT | 0.5 | 0.5 | 63 |
| 75 | TioP | BHT | 0.5 | 0.5 | 76 |
| 50 | TBP | BHT | 0.3 | 0.3 | 40 |
| 75 | TBP | BHT | 0.3 | 0.3 | 88 |

What is claimed is:

1. A hardener composition for use as a component of a two component polyurethane coating composition, consisting essentially of:

a polyisocyanate, a catalyst, for promoting reaction of the polyisocyanate with a reactive hydrogen compound, a first antioxidant selected from the group consisting of sterically hindered phenols and secondary aryl amines, and a second antioxidant selected from organophosphites of the formula:

$$(RO)_3P$$

wherein R has less than 10 carbon atoms and is alkyl or aryl, wherein the first and second antioxidants are present in amounts sufficient to stabilize the color of the hardener composition, said hardener composition being the first component of the two component polyurethane coating composition, the second component being an active hydrogen compound.

2. The hardener composition of claim 1, wherein the polyisocyanate comprises one or more compounds of the general formula:

$$O{=}C{=}N{-}Y{-}(N{=}C{=}O)_n$$

wherein:

Y is an aromatic, aliphatic or cycloaliphatic polyvalent group, and n is 1 or more.

3. The hardener composition of claim 1, wherein the polyisocyanate comprises one or more aliphatic polyisocyanate dimer, trimer, or product of condensation of two or more dimers, two or more trimers, or dimers with trimers derived from isophorone diisocyanate, ethylene diisocyanate, tetramethylene diisocyanate, hexamethylene diisocyanate, decamethylene diisocyanate, or norbornene diisocyanate.

4. The hardener composition of claim 1, wherein the catalyst comprises a tertiary amine, an amidine, an organometallic compound, or a mixture thereof.

5. The hardener composition of claim 1, wherein the catalyst comprises a dialkyltin dicarboxylate, wherein the alkyl groups of the dialkyltin dicarboxylate are each independently selected from alkyl groups containing from 1 to 12 carbon atoms per group and the carboxylate groups of the dialkyltin dicarboxylate are each independently selected carboxylate groups containing from 2 to 32 carbon atoms per group.

6. The hardener composition of claim 1, wherein the first antioxidant comprises one or more sterically hindered phenols selected from 2,6-ditertiarybutyl-4-methylphenol, 2,4-dimethyl-6-butylphenol, 4,4'-methylene-bis(2,6-di-tert-butylphenol), 2,6-di-tertbutyl-N-N'dimethylamino-p-cresol, butylated hydroxyanisole, 2,6-di-tertbutylphenol, 2,4,6-tritertbutylphenol, 2-tert-butylphenol, 2-6-diisopropylphenol, 2-methyl-6-tert-butylphenol, 2,4-dimethyl-6-tertbutylphenol, 4-(N,N-dimethylaminomethyl)-2,8-di-tertbutylphenol, and 4-ethyl-2,6-di-tertbutylphenol.

7. The hardener composition of claim 1, wherein the second antioxidant is selected from the group consisting of tri(butyl)phosphite, triisoctylphosphite, tri(phenyl)phosphite, and tri(2,4-di-t-butyl)phosphite.

8. The hardener composition of claim 1, wherein the hardener composition further comprises an organic aprotic solvent.

* * * * *